(12) United States Patent
Takeda

(10) Patent No.: US 12,327,876 B2
(45) Date of Patent: Jun. 10, 2025

(54) BATTERY PACK AND ELECTRICAL EQUIPMENT

(71) Applicant: Koki Holdings Co., Ltd., Tokyo (JP)

(72) Inventor: Yuuki Takeda, Shanghai (CN)

(73) Assignee: Koki Holdings Co., Ltd., Tokyo (JP)

( * ) Notice: Subject to any disclaimer, the term of this patent is extended or adjusted under 35 U.S.C. 154(b) by 1261 days.

(21) Appl. No.: 17/051,431

(22) PCT Filed: Sep. 20, 2019

(86) PCT No.: PCT/JP2019/036998
§ 371 (c)(1),
(2) Date: Oct. 28, 2020

(87) PCT Pub. No.: WO2020/066901
PCT Pub. Date: Apr. 2, 2020

(65) Prior Publication Data
US 2021/0234225 A1    Jul. 29, 2021

(30) Foreign Application Priority Data

Sep. 27, 2018 (CN) .......................... 201811131836.X

(51) Int. Cl.
*H01M 50/284* (2021.01)
*B25D 17/00* (2006.01)
(Continued)

(52) U.S. Cl.
CPC .......... *H01M 50/284* (2021.01); *B25D 17/00* (2013.01); *B25F 5/02* (2013.01); *H01M 50/213* (2021.01);
(Continued)

(58) Field of Classification Search
CPC ............ H01M 50/284; H01M 50/213; H01M 50/227; H01M 50/247; B25D 17/00; B25F 5/02
See application file for complete search history.

(56) References Cited

FOREIGN PATENT DOCUMENTS

| EP | 3534427 | 9/2019 |
|---|---|---|
| JP | 2006263830 | 10/2006 |

(Continued)

OTHER PUBLICATIONS

JP2014131132A (Teruo) English translation from Espacenet (Year: 2014).*

(Continued)

*Primary Examiner* — Haroon S. Sheikh
*Assistant Examiner* — Claire A Rutiser
(74) *Attorney, Agent, or Firm* — JCIPRNET

(57) ABSTRACT

Provided is a battery pack which is miniaturized by reducing the number of components of a latch mechanism of the battery pack. In the battery pack comprising housings that accommodate a plurality of battery cells, and detachable latches, the latches have manipulation parts that are manipulated by an operator, springs that bias the manipulation parts to the outside of the housings, and first abutting parts on which ends of the springs abut. The manipulation parts move horizontally below the upper wall of the housing, and portions thereof are exposed to the outside from through holes formed in the housing. Furthermore, the latches are supported from below by any one among a separator holding the battery cell, a circuit board, and a lower case.

8 Claims, 12 Drawing Sheets

(51) Int. Cl.
  *B25F 5/02*      (2006.01)
  *H01M 50/213*    (2021.01)
  *H01M 50/227*    (2021.01)
  *H01M 50/247*    (2021.01)

(52) U.S. Cl.
  CPC ........ *H01M 50/227* (2021.01); *H01M 50/247* (2021.01)

(56) References Cited

FOREIGN PATENT DOCUMENTS

| | | |
|---|---|---|
| JP | 2013111673 | 6/2013 |
| JP | 2013191289 | 9/2013 |
| JP | 2014231132 | 12/2014 |
| JP | 2016101623 | 6/2016 |
| WO | 2018079724 | 5/2018 |
| WO | 2019106932 | 6/2019 |

OTHER PUBLICATIONS

JP2006263830A (Tanabe) Translation (Year: 2006).*
JP2013191289A (Hamano) translation (Year: 2013).*
"International Search Report (Form PCT/ISA/210) of PCT/JP2019/036998," mailed on Dec. 3, 2019, with English translation thereof, pp. 1-4.
"Search Report of Europe Counterpart Application", issued on Nov. 11, 2021, p. 1-p. 6.

* cited by examiner

BATTERY PACK AND ELECTRICAL EQUIPMENT

CROSS-REFERENCE TO RELATED APPLICATION

This application is a 371 application of the International PCT application serial no. PCT/JP2019/036998, filed on Sep. 20, 2019, which claims the priority benefits of China Patent Application No. 201811131836.X, filed on Sep. 27, 2018. The entirety of each of the above-mentioned patent applications is hereby incorporated by reference herein and made a part of this specification.

BACKGROUND

Technical Field

The disclosure relates to a detachable battery pack that accommodates multiple battery cells in a case and to an electrical equipment using the battery pack.

Description of Related Art

In an electrical equipment such as a power tool that rotates a motor with electric power and converts the rotational motion into at least one of reciprocating motion and rotational motion of a moving member, a lighting equipment that emits light by electrical energy, an acoustic equipment that emits sound and the like, it is common to use a battery pack as a power supply. The battery pack includes multiple chargeable and dischargeable battery cells, and these are accommodated in a case made of synthetic resin. The battery pack is provided with an attachment and detachment mechanism for attaching to and detaching from the electrical equipment main body by using a battery side rail part, and a terminal part that enables electrical connection when the battery pack is attached. Further, an equipment side rail part that guides the battery side rail part is provided on the electrical equipment main body side. The electrical equipment which such a battery pack is attached to or detached from includes various kinds of equipment, such as an impact driver, a driver drill, a grinder, a sander, a nailer, a screwdriver, a tacker, a dust collector, a blower, a pump, a high-pressure washer, a chain saw, a mower, a pruner, a tiller, a torchlight, a radio, and the like. While the battery pack is required to have a predetermined electric capacity, it is also required to be small and lightweight. Patent Document 1 is known as an example of an electrical equipment (power tool) using such a battery pack.

RELATED ART

Patent Document

[Patent Document 1] Japanese Laid-Open No. 2016-101623

SUMMARY

Technical Problem

The battery pack is provided with an attachment and detachment mechanism that allows the battery pack to be horizontally slid with respect to the electrical equipment main body so as to be attached and detached, and a latch mechanism that locks the battery pack so that it does not come off from the attachment and detachment mechanism during attachment. The latch mechanism of Patent Document 1 has a latch button (manipulation part) protruding outward from the right and left side surfaces of the battery pack, and when the battery pack is to be detached, the latch button is pressed to the inside to temporarily retract a latch claw. In this way, the engagement state between the latch claw and a latch hole on the electrical equipment main body side is released. When the battery pack is attached to the electrical equipment main body, the latch mechanism of the battery pack holds the latch claw in the state of being engaged with the latch hole on the electrical equipment main body side by the action of a spring, whereby the battery pack is held on the electrical equipment main body. Further, when the battery pack is attached in the state where the latch claw is engaged with the latch hole on the electrical equipment main body side, multiple battery side terminals of the battery pack and multiple equipment side terminals on the electrical equipment main body side contact each other, and power can be supplied.

The housing of the battery pack is divided into an upper case and a lower case, and the latch mechanism is supported on the upper case side of the battery pack to be horizontally movable (slidable) in the left-right direction. A sliding part that guides the movement (sliding) of the latch mechanism is formed on the inner upper wall of the upper case, and the latch part, which is attached to the sliding part in contact with the sliding part, is held by fixing a cover member, which presses the latch part from below, to the inside of the upper case. The cover member is a member separate from the upper case, and the cover member is screwed to the upper case. In the latch mechanism of Patent Document 1, since the cover member is provided for each of the latch mechanism on the right side surface and the latch mechanism on the left side surface, the number of components is increased, and the number of steps of assembly for screwing work is increased. In addition, a disposition space for the cover member for holding the latch mechanism is required, which hinders the miniaturization of the battery pack.

The disclosure has been made in view of the above background and provides a battery pack and an electrical equipment with a reduced number of components.

The disclosure also provides a battery pack and an electrical equipment in which the movable part of the latch mechanism is held by an insulator inside the battery pack, and the size of the battery pack in the height direction is reduced.

The disclosure also provides a battery pack and an electrical equipment in which the structure for holding the movable part and the sliding surface of the latch mechanism is improved so that the latch mechanism can operate smoothly.

Solution to the Problem

Characteristic features of the disclosure described herein will be described below.

According to one feature of the disclosure, a battery pack includes: multiple battery cells; a housing which has a first case part and a second case part located below the first case part and which accommodates the battery cells; and a latch part provided on the first case part. The latch part has a manipulation part to be manipulated by an operator, a biasing part which biases the manipulation part to an outside of the housing, and a first abutting part which one end side of the biasing part abuts. The manipulation part moves in a horizontal direction on an inside of an upper wall of the housing, and a portion of the manipulation part is exposed to the outside from a through hole formed in the housing. A support part which regulates the movement of the latch part in the horizontal direction is provided on the second case part side. The support part supports the latch part from below. The support part is provided on a member that holds the battery cells. The battery pack further includes a separator as the member that holds the battery cells, and the support part which supports the latch part from below and which regulates the movement of the latch part in the horizontal direction is formed on the separator. The separator is a synthetic resin molded product which maintains the battery cells in an aligned state, and the support part of the latch part is a protrusion in a rib shape formed to protrude from a surface of the separator, and an upper surface of the protrusion serves as a sliding surface with a lower surface of the manipulation part. The protrusion may be formed by multiple ribs formed on an upper surface of the separator and having long sides in a left-right direction.

According to another feature of the disclosure, the housing has: an upper case formed with a rail part and a connection terminal for attaching to an electrical equipment main body, and a lower case closed by the upper case to form a space for accommodating the battery cells therein. The through hole is formed in a side wall surface of the upper case. A second abutting part is provided on an extension of an axis of the through hole and abuts an other end side of the biasing part. The second abutting part has a surrounding part which surrounds at least a portion of the other end of the biasing part.

According to still another feature of the disclosure, the biasing part is a coil spring, and each of the first abutting part and the second abutting part is formed with a protrusion for holding the coil spring by protruding to a center of the coil spring, or with a recess for holding the coil spring by partially accommodating an end of the coil spring. Further, the battery pack further includes: a separator which maintains the battery cells in an aligned state; and a circuit board fixed above the separator, and the support part is provided on the circuit board. Further, the support part may be provided on the second case part (lower case). An electrical equipment is configured by attaching the battery pack having the above configuration to an electrical equipment main body having a battery pack attachment part.

Effects

According to the disclosure, since a separate member (case member) attached for fixing the latch inside the upper case is omitted, the number of components of the battery pack can be reduced. Further, since the ribs formed on the separator achieve the same function, the number of components of the battery pack can be reduced, and the battery pack can be miniaturized. Further, the support member not only supports the latch but also achieves the function of regulating the movement of the latch. Moreover, the circuit board can be positioned by the support member. Further, since the latch part including the coil spring can be temporarily fixed by the upper case alone, the assembly work efficiency is greatly improved.

DESCRIPTION OF THE EMBODIMENTS

First Embodiment

Figure 1:
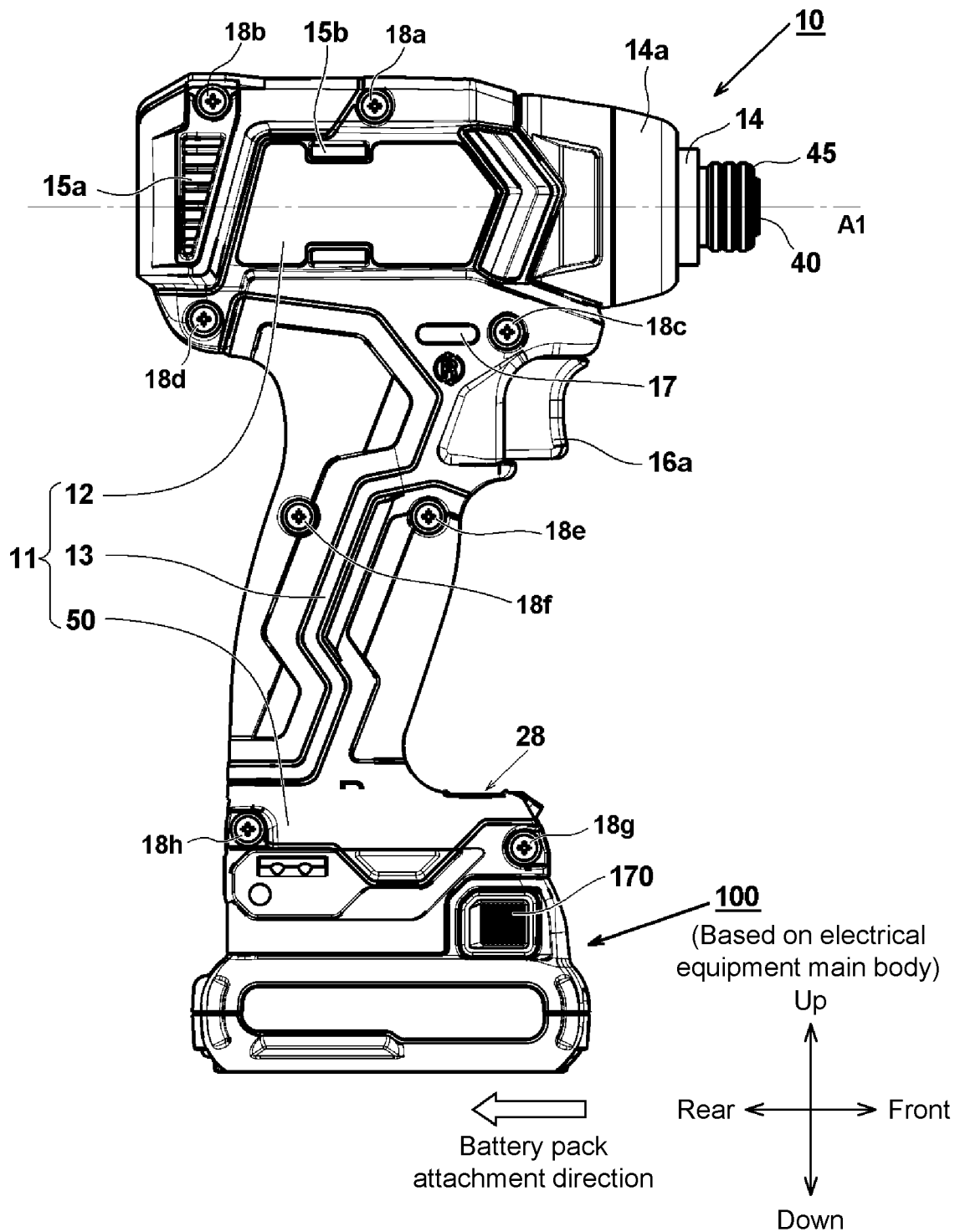
FIG. 1 is a right side view of an electrical equipment (impact tool 1) according to an embodiment of the disclosure.

Embodiments of the disclosure will be described below with reference to the drawings. In this embodiment, an impact tool 1 will be described as an example of an electrical equipment. In addition, in the specification, the up-down direction of the impact tool 1 is described as the direction shown in the drawings, but the direction of the battery pack itself is described with reference to the attachment direction of the battery pack 100 as the front side and the rear side as viewed from the attachment direction as shown in FIGS. 2 to 7.

FIG. 1 is a side view of the impact tool 1 according to an embodiment of the disclosure. The impact tool 1 is a type of electrical equipment including an electrical equipment main body 10 and a battery pack 100 that can be attached to and detached from the electrical equipment main body 10. The impact tool 1 uses the rechargeable battery pack 100 as a power supply, drives a rotary striking mechanism using a motor as a drive source, converts the rotation of a rotation member into an intermittent striking force in the rotation direction by the rotary striking mechanism, and drives a tip tool holder 45 connected to the striking mechanism. A main body housing 11 of the impact tool 1 has three parts, that is, a body part 12 formed in a cylindrical shape for accommodating the motor, a handle part 13 that is a part held by an operator with one hand, and a battery pack attachment part 50 provided at the tip of the handle part 13 for attaching the detachable battery pack 100. The main body housing 11 is manufactured by molding a synthetic resin of plastic into two parts on the left and right sides, and is fixed by multiple screws 18a to 18h. The handle part 13 extends downward to be substantially orthogonal to the central axis (rotation axis A1) of the body part 12, and an operation lever (trigger lever 16a) of a trigger switch (which will be described later with reference to FIG. 3) for controlling ON/OFF of the motor is provided at a position where the index finger is located when the operator grips the handle part 13. A forward/reverse switching lever 17 for switching the rotation direction of the motor is provided above and rearward of the trigger lever 16a.

The battery pack attachment part 50 for attaching the battery pack 100 is formed in a lower part of the handle part 13. The battery pack attachment part 50 is a part formed to expand in the radial direction from the central axis of the handle part 13 in the longitudinal direction. The battery pack 100 that is attachable and detachable is attached to the battery pack attachment part 50. The battery pack 100 accommodates multiple secondary batteries such as a lithium-ion battery, and is rated at 10.8 V in this embodiment from the viewpoint of the type and number of battery cells that are accommodated. The battery pack 100 can be used not only in the impact tool 1 but also in various types of electrical equipment that operate at the same rated voltage. When the voltage of the battery pack 100 decreases, the battery pack 100 can be repeatedly used by detaching it and setting it to an external charger (not shown) for charging. When detaching the battery pack 100, the operator presses latches 160 (not visible in FIG. 1) and 170 while moving the battery pack 100 in a direction (to the front in FIG. 1) opposite to the attachment direction, whereby the battery pack 100 can be detached from the impact tool 1.

An air inlet 15a formed as multiple slits is disposed on the rear side of the side surface of the body part 12. Further, an air outlet 15b is disposed at a position separated by a predetermined distance from the air inlet 15a and closer to the front side. The position at which the air outlet 15b is provided is preferably on the front side of a motor 24. An anvil 40 extends to the front side of the body part 12, and the tip tool holder 45 for holding a tip tool is provided at a front end of the anvil 40.

Figure 2:
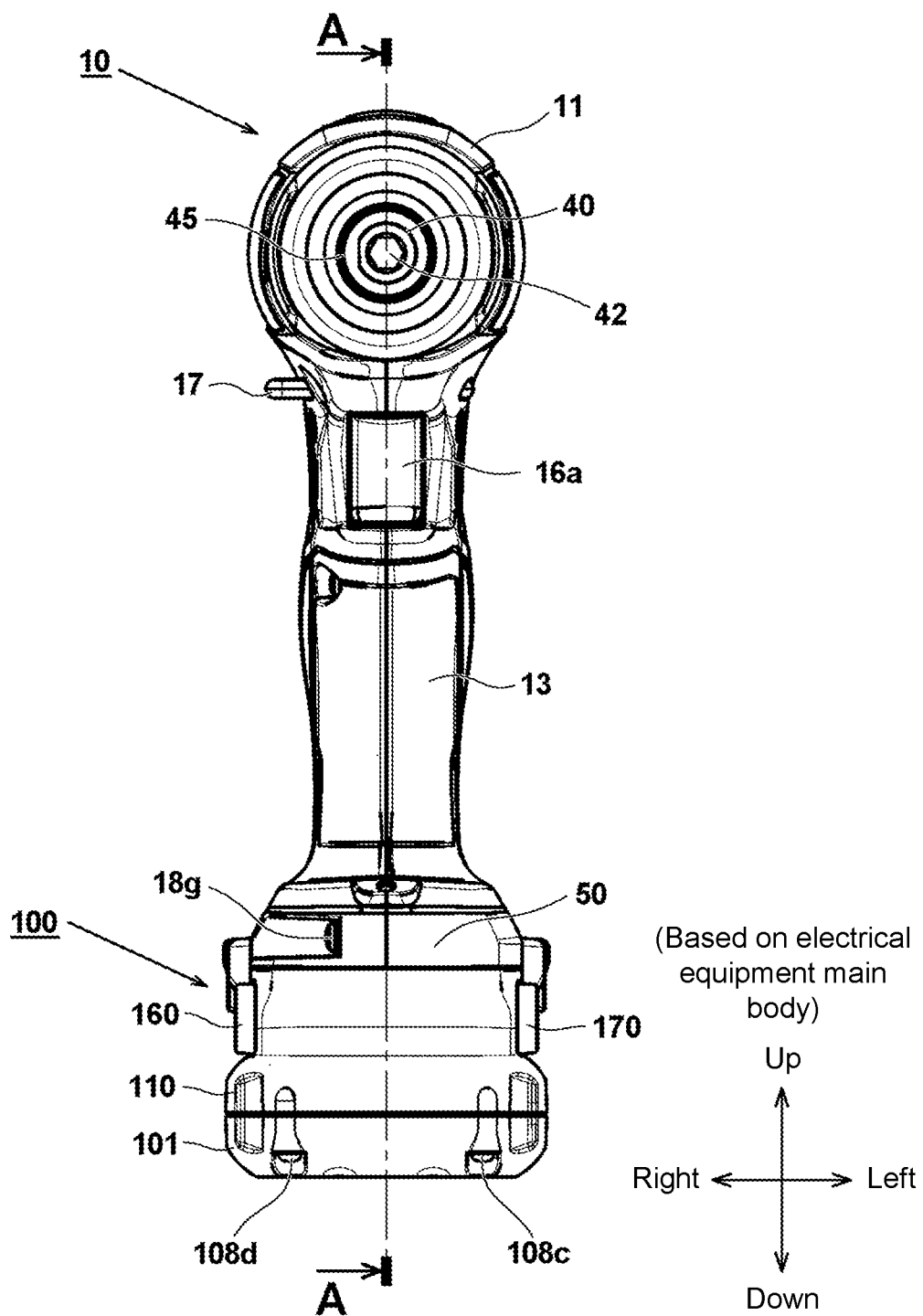
FIG. 2 is a front view of the impact tool 1 of FIG. 1.

FIG. 2 is a front view of the impact tool 1 of FIG. 1. The outer shapes of the body part 12 (see FIG. 1) and the handle part 13 are formed to be relatively small. The body part 12 has a size necessary for accommodating a motor and a power transmission mechanism (to be described later), and the handle part 13 has an optimal outer diameter for being gripped by an operator. In addition, since the battery pack 100 protrudes more in the left-right direction than the handle part 13, the battery pack attachment part 50 is formed to be larger than the handle part 13 in the left-right direction. Manipulation parts of the latches 160 and 170 are exposed on the side surfaces of the battery pack 100. A bottom surface 101e (see FIG. 10) of the battery pack 100 is formed flat so that the impact tool 1 can be placed upright as shown in FIG. 2. The battery pack 100 has a housing formed by a lower case 101 and an upper case 110 made of synthetic resin, and the lower case 101 and the upper case 110 are fixed by screws 108a to 108d (however, 108a and 108b are not visible in FIG. 2). The upper case 110 corresponds to a first case part, and the lower case 101 corresponds to a second case part.

Figure 3:
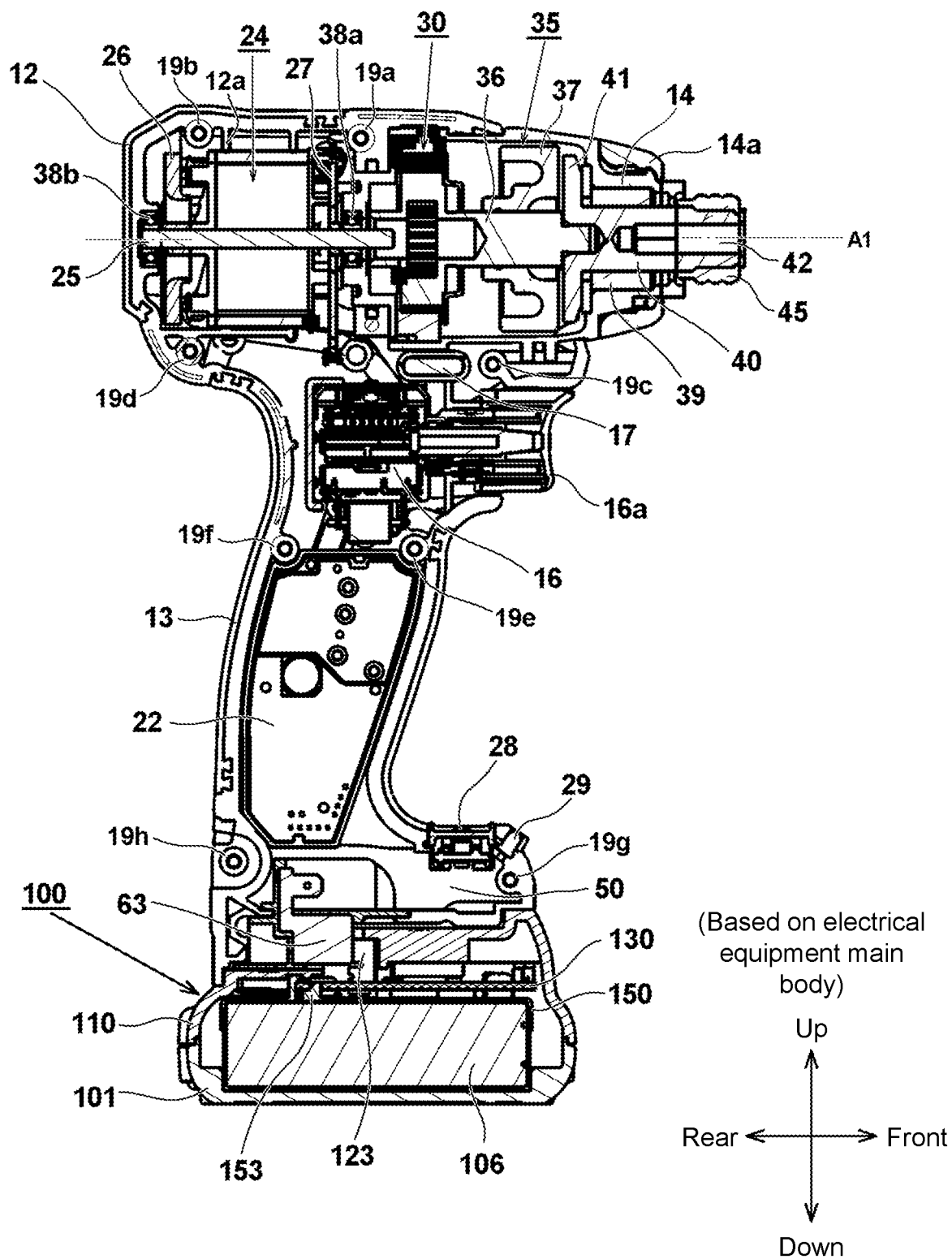
FIG. 3 is a vertical cross-sectional view of the impact tool 1 of FIG. 1, and is a cross-sectional view of the part A-A of FIG. 2.

FIG. 3 is a vertical cross-sectional view showing the internal structure of the impact tool 1 of FIG. 1. The impact tool 1 is configured by the main body housing 11 (the body part 12, the handle part 13, and the battery pack attachment part 50) made of synthetic resin, and a metal hammer case 14 that accommodates a striking mechanism 35. Multiple screw bosses 19a to 19h for screwing are formed on one side (left side) of the main body housing 11, and the left and right parts of the main body housing 11 (reference numeral is shown in FIG. 1) are joined by the multiple screws 18a to 18h (see FIG. 1) with the hammer case 14 being sandwiched. The hammer case 14 has a tapered cup shape, an opening on the rear side, and a small opening (through hole) through which the anvil 40 penetrates and which is formed at the center of the bottom on the front side. A protector 14a made of synthetic resin is a part of the hammer case 14 and is attached to the rear side of the tip tool holder 45. Inside the tubular body part 12 and the hammer case 14 of the main body housing 11, the motor 24, a reduction gear mechanism 30 using a planetary gear, and the striking mechanism 35 having a hammer 37 and the anvil 40 are disposed side by side coaxially with the rotation axis A1.

A trigger switch 16 is provided in the upper part of the handle part 13 of the main body housing 11, and the trigger lever 16a serving as a manipulation part is exposed from the trigger switch 16 to the front side of the main body housing 11. The trigger switch 16 is configured to include a case having a built-in switch mechanism and a manipulation part (trigger lever 16a) provided outside for driving the switch mechanism, and the switch is turned on and off by manipulating the trigger lever 16a. Further, the type and structure of the trigger switch 16 are not limited. In addition to the slide type trigger lever 16a as in the embodiment, for example, a trigger switch having a swing type trigger lever for swinging about a swing axis may be used.

A control circuit board 22 having a function of controlling the speed of the motor 24 by the pulling operation of the trigger lever 16a is accommodated inside the handle part 13. The control circuit board 22 is disposed in the vertical direction to be parallel to the central axis of the handle part 13. A microcomputer (not shown) (hereinafter referred to as the "microcomputer") and a semiconductor switching element (not shown) for forming an inverter circuit are mounted on the control circuit board 22. The semiconductor switching element may be configured by using six field effect transistors (FETs). A switch holder 28 in which an operation mode switching switch and the like are disposed is provided on the outer upper surface of the battery pack attachment part 50. A light emitting part 29 for irradiating an object to be worked by the tip tool (not shown) is provided in front of the switch holder 28. Here, a light emitting diode (LED) is used as the light emitting part 29. Various manipulation buttons such as a striking strength setting button, an irradiation switch of the light emitting part 29, a check button for the remaining power of the battery pack 100, and a corresponding display lamp are disposed on the switch holder 28.

A brushless DC motor is used as the motor 24 and is driven by an exciting current generated by an inverter circuit. A rotation shaft 25 of the motor 24 is disposed such that its axis A1 extends in the longitudinal direction of the body part 12. A stator of the motor 24 is configured by a stator core formed of a laminated iron core and having multiple magnetic pole sheets, and a coil (not shown) wound by use of an insulator made of a non-conductor attached to the front and rear sides of the stator core. A rotor (not shown) forms a magnetic path with a permanent magnet accommodated inside the laminated iron core. The motor 24 is supported by a rib 12a extending from the inside of the body part 12 of the main body housing 11 to the motor 24 side.

A cooling fan 26 for cooling the motor 24 is provided on the axial direction rear part of the motor 24 and coaxially with the rotation shaft 25. The rotation shaft 25 is axially supported by a bearing 38a on the front side and a bearing 38b on the rear side of the stator core, and the cooling fan 26 is disposed between the bearing 38b and the stator core. The cooling fan 26 rotates in synchronization with the motor 24, and when the cooling fan 26 rotates, the outside air is sucked from the air inlet 15a (see FIG. 1) on the rear side of the main body housing 11 to cool the motor 24, and the air after cooling is discharged to the outside from the air outlet 15b (see FIG. 1).

A sensor board 27 is disposed on the axial direction front part of the motor 24 and between the stator core and the bearing 38a. The sensor board 27 is mounted with three magnetic detection parts (not shown) for detecting the magnetic field of the permanent magnet included in the rotor, and is formed of an annular printed board. Commercially available Hall ICs may be used as the magnetic detection parts, and multiple (three in the embodiment) Hall ICs are mounted at predetermined intervals at positions facing the permanent magnet of the rotor. The motor 24 is star connected, and the end of the coil (not shown) wound around the stator core is connected to the wiring pattern of the sensor board 27 by soldering.

The reduction gear mechanism 30 reduces the output of the motor 24 at a predetermined reduction ratio and transmits it to a spindle 36. Here, a known reduction gear mechanism using a planetary gear is used. The spindle 36 is connected to the output side of the reduction gear mechanism 30, has a spindle cam groove (not shown) formed on the outer peripheral surface thereof, and has a planet carrier of the reduction gear mechanism 30 formed on the rear side of the shaft part. The spindle 36 is manufactured by integrally molding metal for its strength.

The hammer 37 is disposed on the outer peripheral side of the shaft part of the spindle 36, and has a hammer cam groove formed on the inner peripheral side. The hammer 37 is held by a cam mechanism using a steel ball (not shown), and the outer peripheral surface of the spindle 36 and a part of the inner peripheral surface of the hammer 37 are in contact with each other. Further, the cam mechanism is omitted in FIG. 3. When the reaction force received from the tip tool is low, the hammer 37 rotates to interlock with the rotation of the spindle 36, but when the reaction force received from the tip tool increases, the cam ball of the cam mechanism (not shown) moves, whereby the relative position of the hammer 37 and the spindle 36 in the rotation direction slightly fluctuates, and the hammer 37 largely moves to the rear side. Since the hammer 37 is always biased to the front side by a hammer spring (not shown), the movement of the hammer 37 to the rear side is performed while compressing the hammer spring (not shown).

Two blades 41 to be struck are formed at positions separated by 180 degrees in the circumferential direction at the rear end of the anvil 40. The blade 41 has a shape that extends outward in the radial direction and is struck by the striking claw of the hammer 37. The side surface of the blade 41 in the rotation direction is formed with two surfaces including a struck surface that is struck when the hammer 37 rotates in the fastening direction and a struck surface that is formed on the opposite side and that is struck when the hammer 37 rotates in the loosening direction. The rotation body of the spindle 36 and the anvil 40 is axially supported on the hammer case 14 by a metal 39 on the front side. The tip tool holder 45 has an attaching hole 42 that has a hexagonal cross-sectional shape and extends rearward in the axial direction from the front end of the anvil 40, and includes a sleeve that moves forward and backward on the outer peripheral side of the anvil 40.

Figure 4:
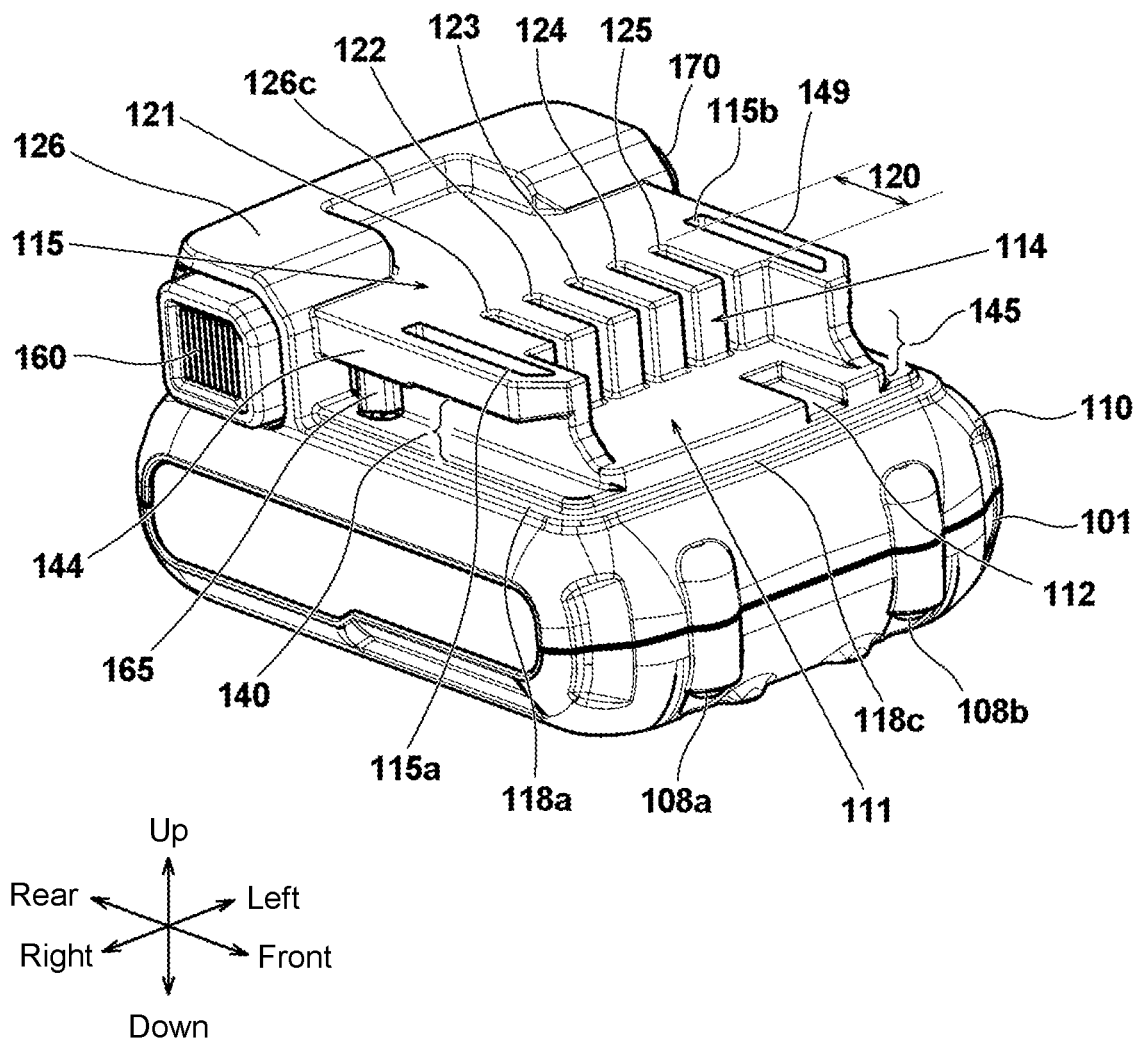
FIG. 4 is a perspective view of the battery pack 100 of FIG. 1 alone.

FIG. 4 is a perspective view of the battery pack 100 according to an embodiment of the disclosure. The battery pack 100 can be attached to and detached from the battery pack attachment part 50 (see FIG. 1). The housing of the battery pack 100 is formed by the lower case 101 and the upper case 110 that are separable in the up-down direction. The lower case 101 and the upper case 110 are fixed to each other by a member that does not conduct electricity, such as four screws 108*a* to 108*d* made of synthetic resin (108*c* and 108*d* are not visible in FIG. 4). The upper case 110 is formed with a rail mechanism in which two rail grooves 140 and 145 are formed for attaching to the battery pack attachment part 50. The rail grooves 140 and 145 are grooves shaped so that their longitudinal directions are parallel to the attachment direction of the battery pack 100 and are recessed inward from the left and right side surfaces 144 and 149 of the upper case 110. The front ends of the groove parts of the rail grooves 140 and 145 are open ends, and the rear ends thereof are closed ends connected to a front wall surface of a raised part 126. The rail grooves 140 and 145 are formed in a shape corresponding to rails 54 and 57 (see FIG. 5 to be described later) formed in the battery pack attachment part 50 of the electrical equipment main body 10 and, in a state where the rail grooves 140 and 145 are fitted to the rails 54 and 57, are fixed to the electrical equipment main body 10 by being locked by locking parts 165 and 175 (175 is not visible in FIG. 4) which are claws of the latches. When the battery pack 100 is to be detached from the electrical equipment main body 10, by pressing the latches 160 and 170 on the left and right sides inward, the locking parts 165 and 175 move inward and the locked state is released. Therefore, in this state, the battery pack 100 is moved to the side opposite to the attachment direction.

A flat lower step surface 111 is formed on the front side of the upper case 110, and an upper step surface 115 formed higher than the lower step surface 111 is formed near the center. The lower step surface 111 and the upper step surface 115 are formed in a staircase shape, and the connecting part thereof is a step part 114 that is a vertical surface. The front side part of the upper step surface 115 from the step part 114 is a slot group disposition region 120. In the slot group disposition region 120, multiple slots 121 to 125 are formed to extend rearward from the step part 114 in the front. The slots 121 to 125 are notched parts having a predetermined length in the battery pack attachment direction, and multiple battery side terminals 131 to 135 (to be described later with reference to FIG. 7) that can be fitted to the equipment side terminals of the electrical equipment main body 10 or to an external charging device (not shown) are provided inside the notched parts. The slots 121 to 125 are formed so that the terminals on the power tool main body side can be slid and inserted to the rear side from the lower step surface 111 side.

In the slots 121 to 125, the slot 121 on the side closer to the rail groove 140 on the right side of the battery pack 100 serves as an insertion port for a positive electrode terminal (C+ terminal) for charging. The slot 122 adjacent to the slot 121 serves as an insertion port for the positive electrode terminal (+ terminal) for discharging. In addition, the slot 124 on the left side of the battery pack 100 serves as an insertion port for a negative electrode terminal (− terminal). In addition to the positive electrode terminal and the negative electrode terminal, two signal terminals for signal transmission used for control of the battery pack 100, the electrical equipment main body 10 and an external charging device (not shown) are disposed. Here, a slot 123 for an LS terminal for outputting by a thermistor (temperature sensitive element) (not shown) provided in contact with the battery cell, and a slot 125 for an LD terminal for outputting an abnormality stop signal by a battery protection circuit (not shown) included in the battery pack 100 are provided.

The raised part 126 is formed on the rear side of the upper step surface 115 in a way in which its outer shape is raised above the upper step surface 115. A recessed stopper 126*c* is formed near the center of the raised part 126. The stopper 126*c* is a recess for avoiding a protrusion 69*a* (see FIG. 5 to be described later) when the battery pack 100 is attached to the battery pack attachment part 50, and the protrusion 69*a* serves as an abutting surface. When the protrusion 69*a* on the electrical equipment main body 10 side is inserted until it abuts the stopper 126c, multiple terminals (equipment side terminals) provided on the electrical equipment main body 10 and multiple connection terminals (not shown) provided on the battery pack 100 make good contact and become conductive. In addition, the locking parts 165 and 175 (175 is not visible in the figure) of the latches 160 and 170 protrude in the left-right direction inside the rail grooves 140 and 145 by the action of the biasing part such as a spring, and by engaging with notch grooves 56 and 59 (56 is not visible in the figure) formed in the rails 54 and 57 of the electrical equipment main body 10, the battery pack 100 is prevented from falling off. The rail grooves 140 and 145 are inclined near the front end of the bottom surface as they go from top to bottom. In the upper part of the rail grooves 140 and 145 in the upper step surface 115, hollow parts 115a and 115b are formed to facilitate injection molding.

A recess 112 having a substantially rectangular parallelepiped shape in a top view is formed on the front side of the lower step surface 111. The recess 112 is an uneven part used to identify whether the battery pack 100 is properly attached to the electrical equipment main body 10, and engages with the protrusion 69b formed on the electrical equipment main body 10 side. In the case of battery packs having different voltages that cannot be attached, attachment is prevented because the recess 112 and the protrusion 69b have different positions and shapes. Therefore, even if multiple types of battery packs having different voltages are manufactured using substantially the same housing, erroneous connection can be prevented by simply changing the positions and shapes of the recess 112 and the protrusion 69b. Further, in the embodiment, when attached to the electrical equipment main body 10, step parts 118a to 118c are formed on the outer edge of the joint part which is the boundary between the electrical equipment main body 10 and the battery pack 100 when viewed from the outside.

Figure 5:
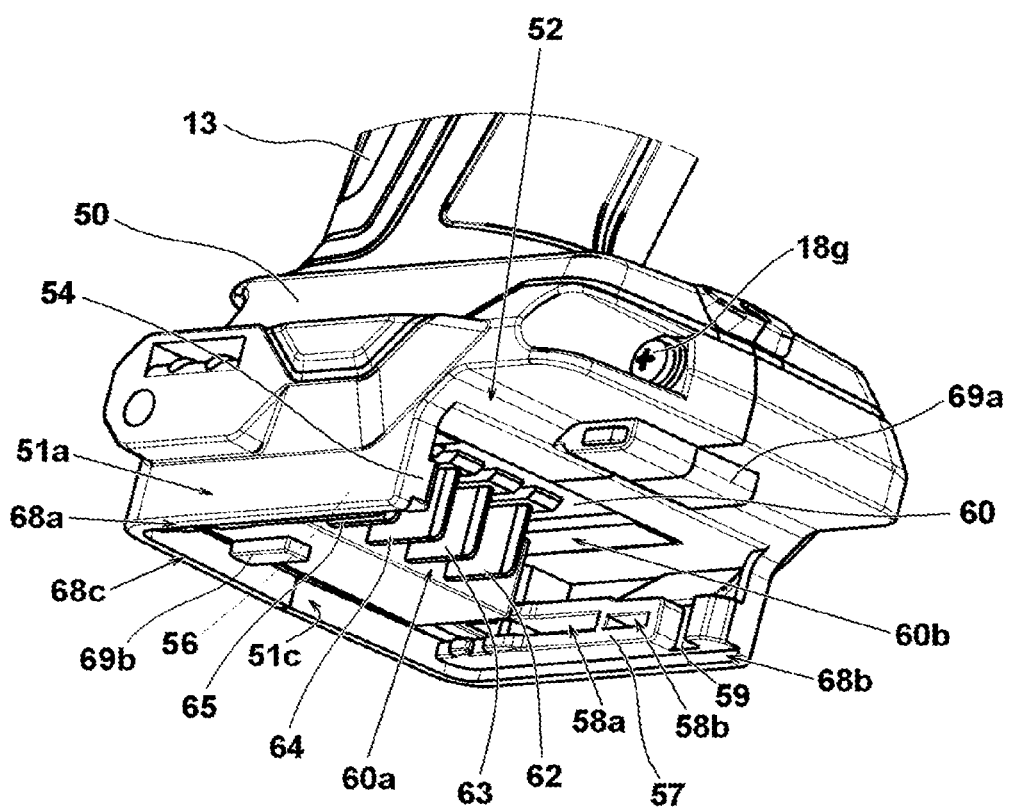
FIG. 5 is a partial perspective view showing the shape of the battery pack attachment part 50 of the electrical equipment main body 10 of FIG. 1.

FIG. 5 is a partial perspective view showing the shape of the battery pack attachment part 50 of the electrical equipment main body 10. Not only the electrical equipment main body 10 but also any electrical equipment using the battery pack 100 as a power supply has the battery pack attachment part 50 corresponding to the shape of the battery pack 100 to be attached. The battery pack attachment part 50 is formed with the rails 54 and 57 that protrude inward from the inner walls on both the left and right sides and that extend in the front-rear direction being the longitudinal direction, and a terminal part 60 is provided in the upper part of the space sandwiched between them. The rail 57 is formed to extend in the front-rear direction and has an upper surface and a lower surface, and the upper surface and the lower surface engage with the inner upper wall and the inner lower wall of the rail groove 140 of the battery pack 100 to come into contact with each other. Although hollow parts 58a and 58b are formed between the upper and lower sides of the rail 57, they are formed for convenience of injection molding of synthetic resin, and functionally, the hollow parts 58a and 58b may be omitted. The notch groove 59 that is notched in the up-down direction is formed near the front end of the rail 57. The notch groove 59 is a recess or a hooking part that engages with the locking claw (locking part 165) of the latch mechanism. Although the shape of the rail 54 formed inside the right side wall 51a is not visible in the perspective view of FIG. 5, the rail 54 is symmetrical with the rail 57 formed on the left side and has the same shape as the rail 57.

The terminal part 60 is manufactured by integrally molding a non-conductive material such as synthetic resin, and has multiple metal terminals, such as a positive electrode input terminal 62, a negative electrode input terminal 64, an LS terminal 63, and an LD terminal (abnormal signal terminal) 65, which are cast into the synthetic resin. The terminal part 60 is formed with a vertical surface 60a serving as an abutting surface in the attachment direction (front-rear direction) and a horizontal surface 60b. The horizontal surface 60b is a surface adjacent to and facing the upper step surface 115 (to be described later with reference to FIG. 3) when the battery pack 100 is attached. A curved part 52 that abuts the raised part 126 (to be described later with reference to FIG. 3) of the battery pack 100 is formed in front of the horizontal surface 60b, and the protrusion 69a is formed near the center of the curved part 52 in the left-right direction. The protrusion 69a is integrally formed with the housing of the electrical equipment main body 10 which is divided into two parts in the left-right direction, and serves as a stopper for regulating the attachment direction of the battery pack 100 and the relative movement in the direction orthogonal to the attachment direction.

In the battery pack attachment part 50 of the embodiment, a side skirt part 68a extending in a rib shape further to the lower side than the right side edge of the lower surface of the rail 54 is formed, and a side skirt part 68b extending in a rib shape further to the lower side than the left side edge of the lower surface of the rail 57 is formed. Further, the lower end of the rear wall 51c is extended to connect the rear end of the side skirt part 68a and the rear end of the side skirt part 68b to form the side skirt part 68c.

Figure 6:
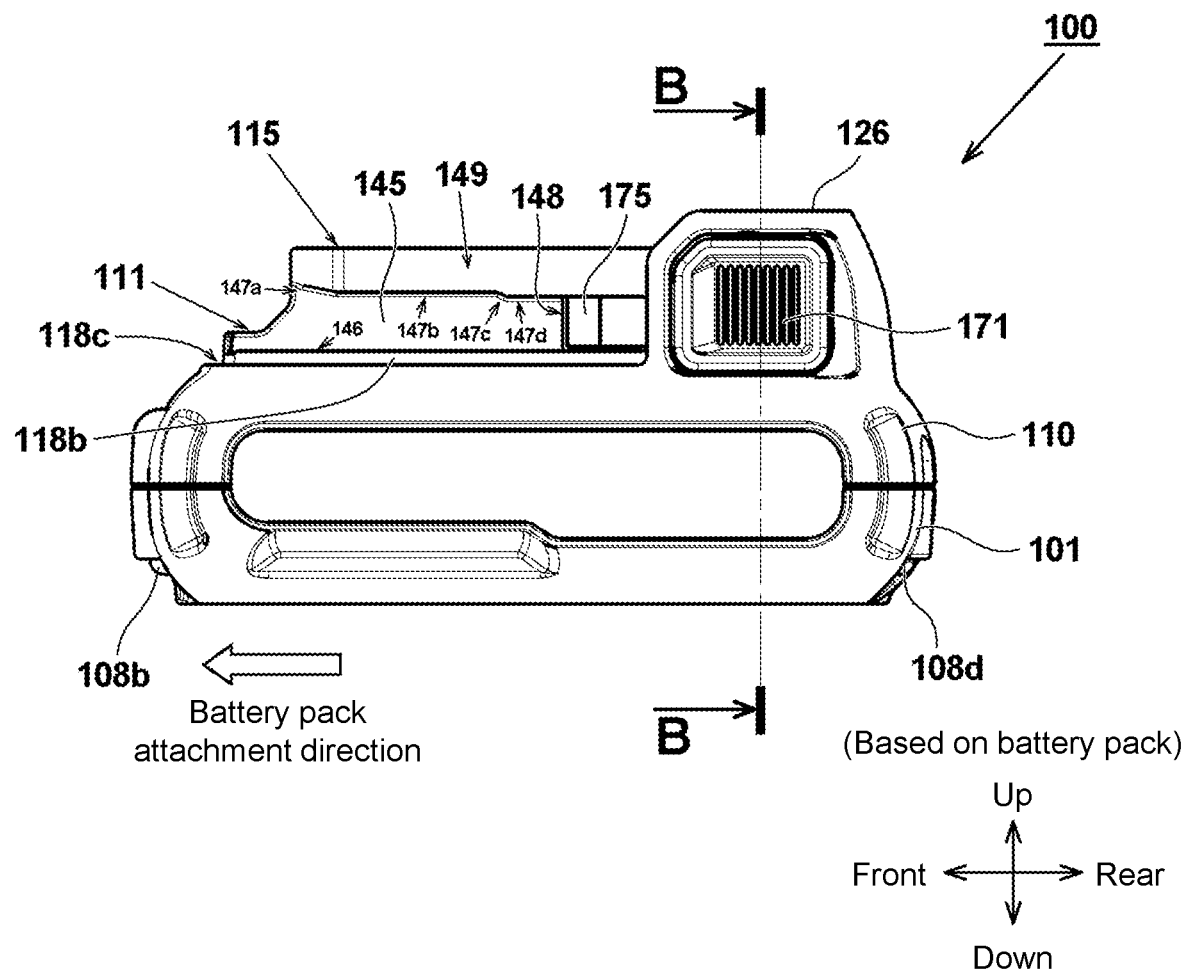
FIG. 6 is a left side view of the battery pack 100.

FIG. 6 is a left side view of the battery pack 100. The rail groove 145 is formed on the left side of the battery pack 100. The rail groove 145 is a concave part that is recessed from the vertical surface to the right side on the left side surface 149 of the upper case 110. The rail groove 145 has a rail groove upper surface 147 (147a to 147d) extending in the front-rear direction and a rail groove lower surface 146. The front end of the rail groove 145 is open, and the rear end is closed by the wall surface continuing from the raised part 126. A latch hole 148 is formed on the rear side of the rail groove 145, through which the locking part (latch claw) 175 penetrates. In order to facilitate the sliding, the rail groove lower surface 146 of the rail groove 145 is formed in a flat shape, while the rail groove upper surface 147 is formed such that the height gradually decreases from the front side to the rear side. That is, the front end is formed with a tapered surface 147a that expands slightly obliquely upward, and a horizontal surface 147b is formed near the middle in the front-rear direction, and a horizontal surface 147d that is lowered through an oblique step part 147c is formed to the rear of it. Similarly, the rail 54 on the electrical equipment main body 10 side also changes to match the height of 147a to 147d from the wide vertical width at the inlet side open end toward the rear side end. With this configuration, when the battery pack 100 is attached to the electrical equipment main body 10 until the locking part 175 abuts the notch groove 56, the battery pack 100 is properly fixed. Further, the shape of the right side surface of the battery pack 100 and the rail groove 140 (see FIG. 4) have the same symmetrical shape as the rail groove 145, and thus the illustration thereof is omitted.

Figure 7:
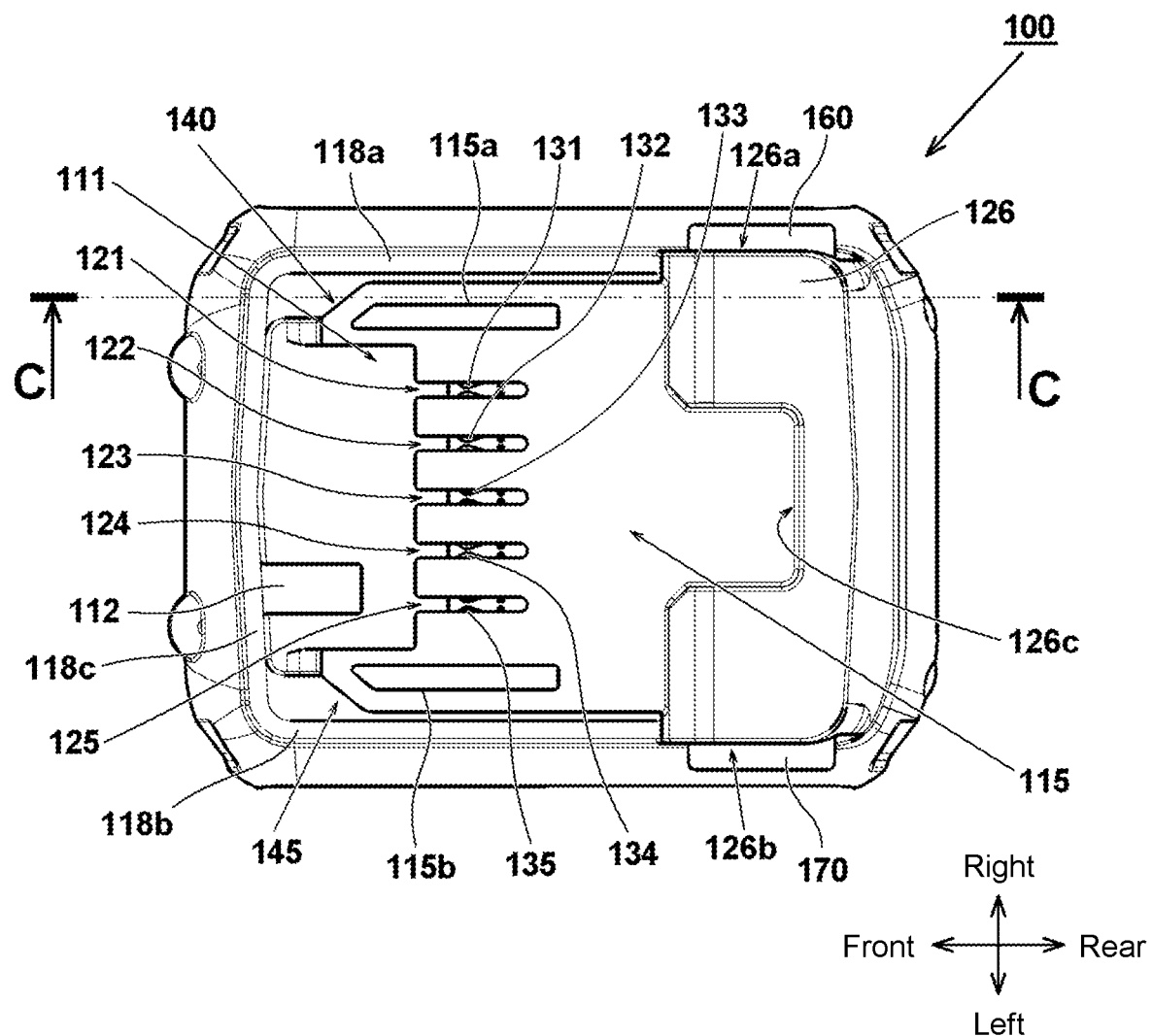
FIG. 7 is a top view of the battery pack 100.

FIG. 7 is a top view of the battery pack 100. In the upper case 110 of the battery pack 100, the upper step surface 115 and the lower step surface 111 are formed, and the slots 121 to 125 that are notched from the lower step surface 111 to the upper step surface are formed, and the battery side terminals 131 to 135 are disposed inside the positions of the slots 121 to 125. The raised part 126 that is raised upward is formed on the rear side of the upper step surface 115. The stopper 126c is formed near the center of the raised part 126 in the left-right direction. The raised part 126 is formed to secure an accommodating space for the latches 160 and 170 in the internal space thereof, and through holes 126a and 126b are formed on both left and right side surfaces of the raised part 126, and the manipulation parts of the latches 160 and 170 protrude. The positions of the latches 160 and 170 in FIG. 7 are the positions (normal positions) in the non-manipulated state, and the respective manipulation parts are in the positions where they are protruded outward by the springs (to be described later). The manipulation direction of the latch 160 is a horizontal direction from right to left, and that of the latch 170 is a horizontal direction opposite to the right-to-left direction of the latch 160, and each moves linearly on a horizontal plane.

The hollow parts 115a and 115b are formed above the parts of the upper step surface 115 where the rail grooves 140 and 145 are formed. These are formed to facilitate the injection molding of the upper case 110, and are provided for manufacturing reasons. The openings at the front ends of the rail grooves 140 and 145 are formed to be oblique in a top view, and are configured to guide the attachment of the rails 54 and 57 (see FIG. 5) into the rail grooves 140 and 145.

Figure 8:
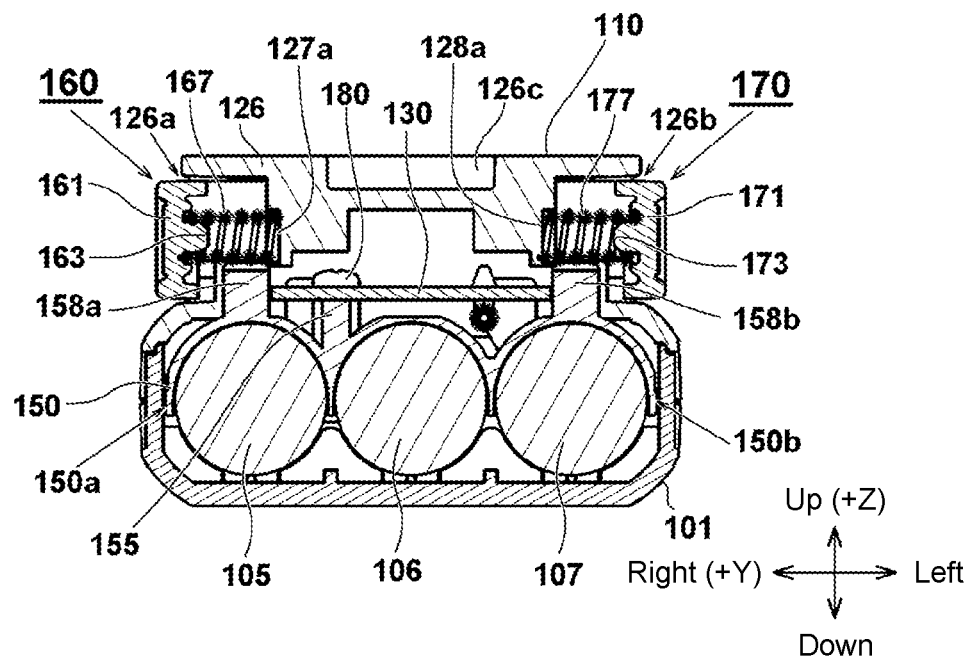
FIG. 8 is a cross-sectional view taken along the line B-B of FIG. 6.

FIG. 8 is a cross-sectional view taken along the line B-B of FIG. 6. The latches 160 and 170 are held to be horizontally movable in the left-right direction of the battery pack 100, and the upper sliding surfaces thereof are held by the upper case 110, and the lower sliding surfaces thereof are held by multiple ribs formed integrally with a separator 150, that is, ribs 156a, 156b, 157a and 157b shown in FIG. 13 (to be described later). The latch 160 is biased by a spring 167 provided between an inner protrusion 127a and a manipulation surface 161, whereby the latch 160 is held in a direction protruding from the through hole 126a to the outside. Similarly, the latch 170 is biased by a spring 177 provided between an inner protrusion 128a and a manipulation surface 171, whereby the latch 170 is held in a direction protruding from the through hole 126b to the outside. The springs 167 and 177 are compression type coil springs. Below the springs 167 and 177, rib-shaped spring stoppers 158a and 158b extending in the left-right direction are formed to prevent the springs 167 and 177 from falling off when they contract. The spring stoppers 158a and 158b are formed integrally with the separator 150, and the springs 167 and 177 and the spring stoppers 158a and 158b are in a non-contact state during normal manipulation. Protrusions 163 and 173 for fitting the ends of the springs 167 and 177 are formed on inner parts of the manipulation surfaces 161 and 171 of the latches 160 and 170. In this way, the outer ends of the springs 167 and 177 are held by the protrusions 163 and 173 of the latches 160 and 170, and the inner ends thereof are held by the protrusions 127a and 128a formed on the ribs for pressing the springs of the upper case, whereby the springs 167 and 177 are held stably. The protrusions 127a and 128a are formed on extensions of the axes of the through holes 126a and 126b, respectively. Further, since the protrusions 163 and 173 and the protrusions 127a and 128a are holding members for preventing the springs 167 and 177 from being displaced in the radial direction, they may be formed as columnar recesses that hold the outer peripheral surfaces of the ends of the springs 167 and 177 instead of being formed as protrusions. The protrusions 163 and 173 correspond to first abutting parts.

It is important that the battery pack 100 be small and lightweight while ensuring the required electric capacity. In the embodiment, three lithium ion batteries rated at 3.6V are accommodated in a space defined by combining the openings of the upper case 110 which has the opening on the lower side and the lower case 101 which has the opening on the upper side. The battery cells 105 to 107 used are of a what is called a 18650 size having a diameter of 18 mm and a length of 65 mm. The battery cells 105 to 107 are substantially accommodated in the lower case 101 with their axial directions in the front-rear direction, and the separator 150 made of synthetic resin is placed on and fixed to the upper parts of the battery cells 105 to 107 to stably fix the battery cells 105 to 107.

The separator 150 also functions as an attachment base for holding the circuit board 130 on the upper part thereof. The circuit board 130 serves as an attachment base for soldering the multiple battery side terminals 131 to 135 (see FIG. 7) and mounts circuit components for battery control such as a microcomputer. A screw hole is formed in the circuit board 130, and the circuit board 130 is fixed by a screw 180 screwed with a screw boss 155 formed in the separator 150. The separator 150 is manufactured by integral molding of synthetic resin such as plastic which is a non-conductive material, is shaped to cover the upper half surfaces of the outer peripheral surfaces of the battery cells 105 to 107, and is formed with joining surfaces 150a and 150b at left and right ends thereof to contact the inner wall surface of the lower case 101.

Figure 9:
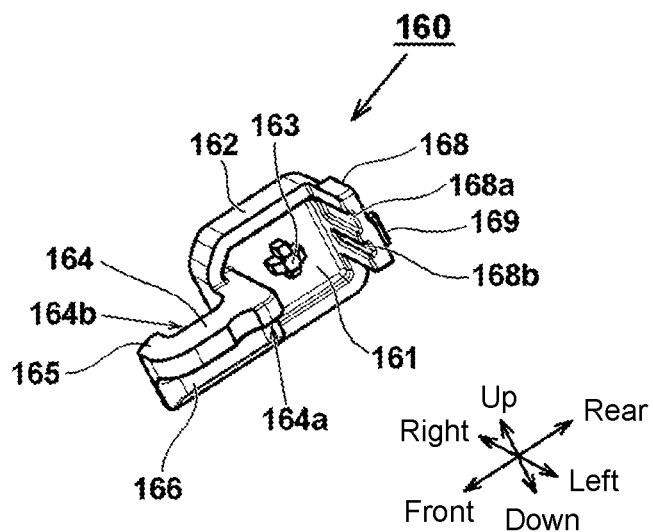
FIG. 9 is a perspective view of the latch 160 alone.

FIG. 9 is a perspective view of the latch 160 alone, which is seen from the inside. The latch 160 is mainly configured by a manipulation part (the manipulation surface 161 and an outer frame 162) manipulated by an operator, and an arm part 164 extending from the manipulation part to the front side, and the part shown in FIG. 9 can be manufactured by integral molding of synthetic resin. The arm part 164 is formed by a plate-shaped horizontal wall which is curved in a bow shape in a top view, and is held by the rib 156a (see FIG. 10 to be described later) formed on the separator 150 near the rear end side of a lower surface 164a of the arm part 164. The front tip of the latch serves as the locking part 165 that serves as the latch claw, and the rear end of the arm part 164 is connected to the outer frame 162. A vertical wall 166 extending downward is formed on the arm part 164 to follow the right contour. An arc-shaped right wall surface 164b of the vertical wall 166 is formed in the same shape as a stopper 117a (see FIG. 12 to be described later) formed on the upper case 110, and the stopper 117a and the vertical wall 166 are in contact with each other, thereby limiting the movement amount of the arm part 164 in the outward direction (rightward direction).

The outer wall of the manipulation surface 161 is formed with multiple fine grooves in the horizontal direction, and the protrusion 163 for holding the spring 167 (see FIG. 8) is formed in the center of the inner wall. A rear wall 168 extending leftward is formed on the rear side of the outer frame 162. The rear surface of the rear wall 168 slides on the inner wall of the upper case 110 to smoothly hold the movement of the latch 160 on the horizontal plane. Further, a stopper piece 169 extending in the horizontal direction from a part of the rear wall 168 to the rear side is formed. The right side of the stopper piece 169 abuts the inner wall surface of the upper case 110, thereby limiting the movement amount of the latch 160 in the outward direction (rightward direction). Two grooves 168a and 168b extending in the horizontal direction are formed on the surface of the rear wall 168 on the spring 167 (see FIG. 8) side. The two grooves 168a and 168b are provided to reduce the thickness of the latch 160.

Figure 10:
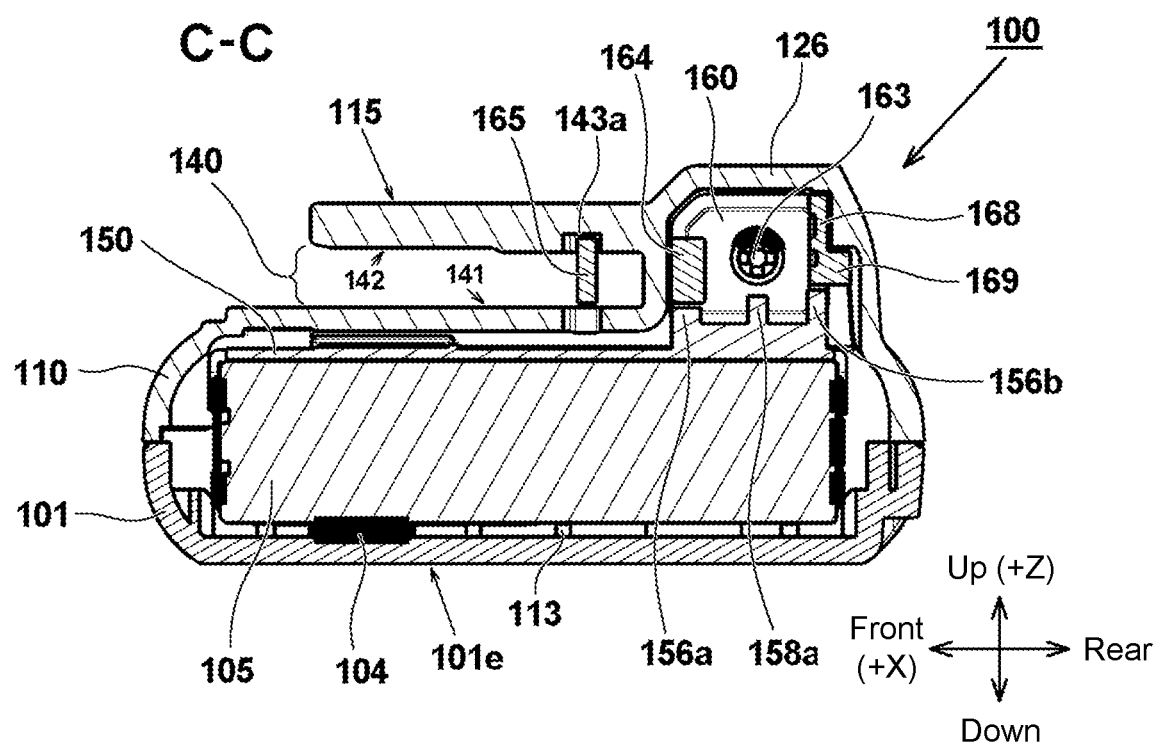
FIG. 10 is a cross-sectional view taken along the line C-C of FIG. 7.

FIG. 10 is a cross-sectional view taken along the line C-C of FIG. 7. The rail groove 140 extending in the front-rear direction is formed on the right side surface of the upper case 110. At the cross-sectional position of the C-C part, the rail groove 140 seems to be separated vertically. The distance between an upper surface 142 and a lower surface 141 of the rail groove 140 is substantially constant. The lower surface of the arm part 164, which is connected to the outer frame 162, of the latch 160 abuts the rib 156a formed integrally with the separator 150, whereby the lower position of the arm part 164 is defined. The lower surface of the rear wall 168 formed on the rear side of the outer frame 162 of the latch 160 abuts the rib 156b formed integrally with the separator 150, whereby the lower position of the rear wall 168 is defined. The spring stopper 158a is further formed between the ribs 156a and 156b. The spring stopper 158a is located below the spring 167 (see FIG. 8) and normally does not contact the spring 167, but when the spring 167 is deformed by being distorted downward, the spring stopper 158a serves to suppress the deformation. Further, the spring stopper 158a also functions as a slide position stopper when the lower part of the outer frame 162 of the latch 160 is pressed inward (left side) of the upper case 110. The stopper piece 169 extending further to the rear side than the vertical surface of the rear wall 168 is formed at a lower part of the right end of the rear wall 168 of the latch 160, and the stopper piece 169 abuts the inner wall on the right side of the upper case 110, thereby regulating the rightward movement of the latch 160 when the latch 160 is released. Therefore, the movement position when the latch 160 is pressed is regulated by the spring stopper 158a, and the rightward movement when the latch 160 is released is regulated by the stopper piece 169 and the right wall surface 164b (see FIG. 9). That is, the support member can both support the latch and regulate the movement of the latch.

The locking part 165 of the latch 160 protrudes rightward from a latch hole 143 (see FIG. 6; the left latch hole 148 is visible in FIG. 6) formed near the rear end of the rail groove 140. The latch hole 143 is also formed in a concave shape on the rail groove upper surface 142 of the rail groove 140, and the upper end part of the locking part 165 is located inside a recess 143a. As described above, since the upper side of the latch 160 is held by the upper case 110 and the lower side of the latch 160 is held by the separator 150, movement in the vertical direction (Z direction) is regulated, and only the movement on the horizontal plane (XY plane) is allowed. Also, in the movement of the horizontal plane, the rear side of the outer frame 162 is guided on the upper case 110 by the rear wall 168, and the front side of the outer frame 162 is guided on the upper case 110 by a part of the arm part 164 that extends in the left-right direction. Therefore, when the latch 160 is moved in the left-right direction (movement to the −Y direction), the movement in the rotation direction around the Z axis is prevented. Therefore, the latch 160 can smoothly slide in the Y direction (left-right direction).

The battery cell 105 is directly held by the lower case 101 further to the lower side than the separator 150 located below the latch 160. On the inner wall side of the bottom surface 101e of the lower case 101, multiple ribs 113 having a curved upper shape are formed at equal intervals for fixing the battery cell 105. A cushion material 104 is interposed below the battery cells 105 to 107 to absorb the shock transmitted from the lower case 101 to the battery cells 105 to 107. The separator 150 of the embodiment is not a shape widely used conventionally that covers all the upper and lower sides of the battery cells 105 to 107, but a shape that covers only the upper half surfaces of the battery cells 105 to 107. Therefore, the vertical height of the battery pack 100 can be reduced by the amount of the separator interposed between the battery cells 105 to 107 and the bottom surface 101e of the lower case 101. In the embodiment, a cover member (separate member) interposed between the latch 160 and the separator 150 for holding the latch 160 is not required in the latch 160, while it is required in the conventional battery pack. Therefore, the vertical height of the battery pack 100 can be reduced by the amount of this omitted separate member. From the cross-sectional view of FIG. 10, it can be recognized that the distance between the rail groove lower surface 141 of the rail groove 140 and the bottom surface 101e of the lower case 101 is within a size close to the diameter of the battery cell 105 accommodated therein. Therefore, it can be understood that the battery pack 100 of the embodiment is formed compactly.

Figure 11:
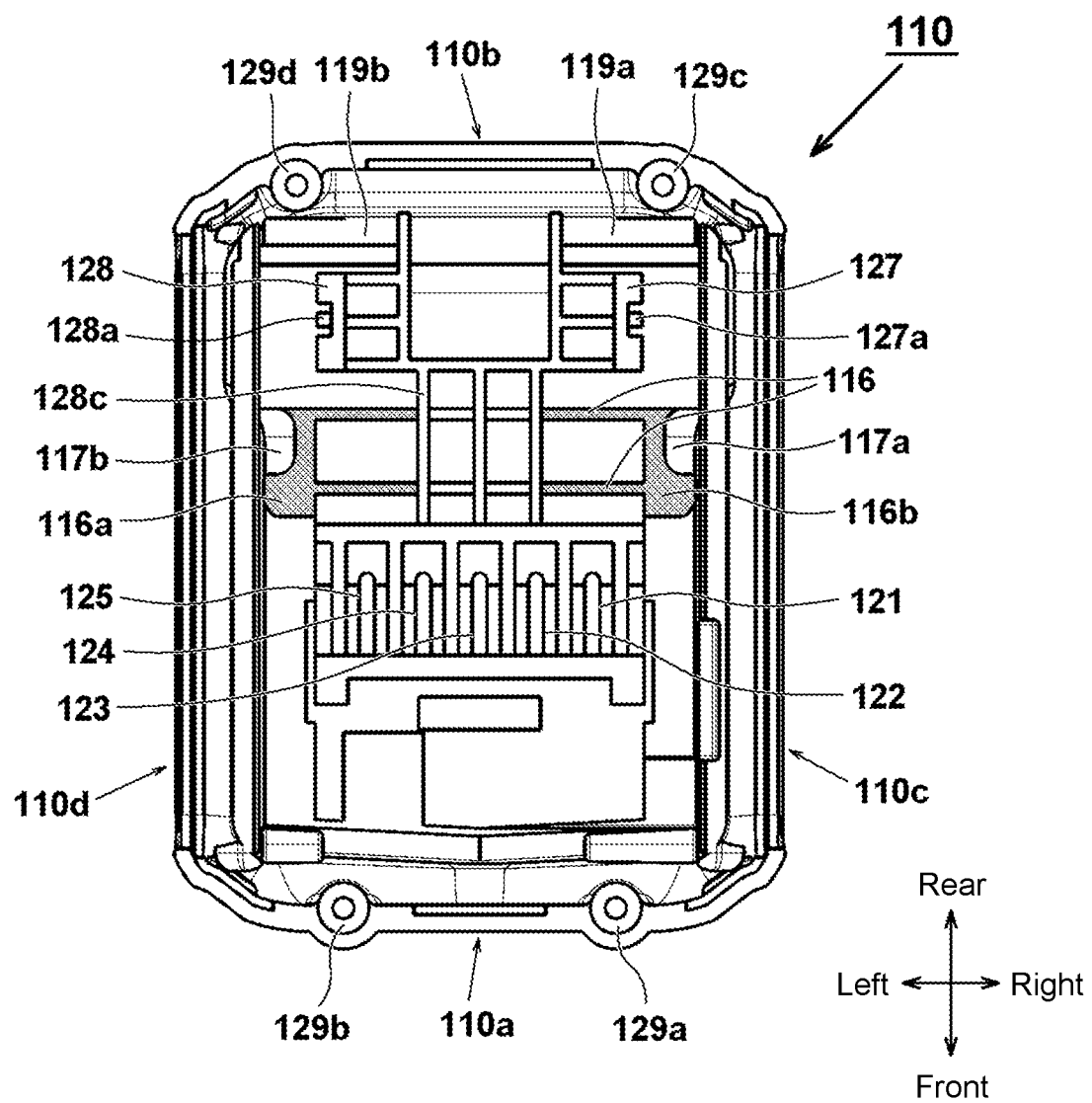
FIG. 11 is a bottom view of the upper case 110 (before the latches 160 and 170 are attached).

FIG. 11 is a bottom view of the upper case 110 and shows a state before the latches 160 and 170 are attached. The upper case 110 has a front wall 110a, a rear wall 110b, a right side wall 110c, and a left side wall 110d, and has a substantially rectangular shape in a bottom view, and multiple screw bosses 129a to 129d for screwing with the lower case 101 are formed on the front wall 110a and the rear wall 110b. The slots 121 to 125 are formed side by side in the left-right direction in the front part of the inner wall of the upper case 110 with respect to the center in the front-rear direction since the slot group disposition region 120 (see FIG. 4) is formed on the front side. In the inner wall (upper wall) on the rear side of the upper case 110, two types of ribs extending in a straight line shape and having different heights, that is, ribs 128c having a large protrusion amount from the inner wall front surface of the upper case 110 and ribs 116 having a small protrusion amount are provided. In the drawing, in order to facilitate identification, the ribs 116 having a small protrusion amount are hatched at a part contacting the upper parts (upper surfaces) of the latches 160 and 170.

Horizontal movement of the horizontal rib 169 (see FIG. 9) of the latch 160 is guided by a step part 119a. Further, the rib 128c that intersect with two ribs 116 extending in the left-right direction is provided near the center of the latch 160 in the left-right direction. In the ribs 116 extending in the left-right direction, the parts with hatched lines contact the arm parts 164 and 174 of the latches 160 and 170, thereby defining the upper position of the arm parts 164 and 174. In order not to increase the sliding resistance of the arm parts 164 and 174, the ribs 116 are formed to be elongated in the left-right direction and have a short width (length in the front-rear direction). Columnar stoppers 117a and 117b extending in the up-down direction are formed to be adjacent to the left and right ends of the ribs 116. The stoppers 117a and 117b are parts which the outer circular arc surfaces (right wall surface 164b) of the arm parts 164 and 174 abut when the latches 160 and 170 are not manipulated. The ribs 116 around the arm parts 164 and 174 have connecting surfaces 116a and 116b that are connected and are formed in a flat shape to prevent the arm parts 164 and 174 from rattling in the up-down direction.

Step parts 119a and 119b which the rear walls 168 and 178 of the latches 160 and 170 abut are formed on the rear side of the upper case 110. The protrusion amount of the step parts 119a and 119b from the front surface of the inner wall of the upper case 110 is formed to be equal to that of the ribs 116. Therefore, in FIG. 11, the hatched part mainly serves as a sliding surface that holds the upper parts of the latches 160 and 170. Spring pressing ribs 127 and 128 are formed on the left and right sides further to the front side than the step parts 119a and 119b. The spring pressing ribs 127 and 128 are parts that hold the ends of the springs 167 and 177 (see FIG.

8), and are formed as recesses (surrounding parts) that surround the ends of the springs 167 and 177 along the outer diameter of the springs 167 and 177, and the protrusions 127a and 128a are formed in the centers of the recesses, thereby stably holding the ends of the springs 167 and 177. The ribs 128c extending in the front-rear direction and the left-right direction are formed around the spring pressing ribs 127 and 128 to enhance the bending rigidity of the upper case 110. Further, the protrusion amount of the ribs 128c from the front surface of the inner wall of the upper case 110 is sufficiently larger than the protrusion amount of the ribs 116. The spring pressing ribs 127 and 128 correspond to second abutting parts.

Figure 12:
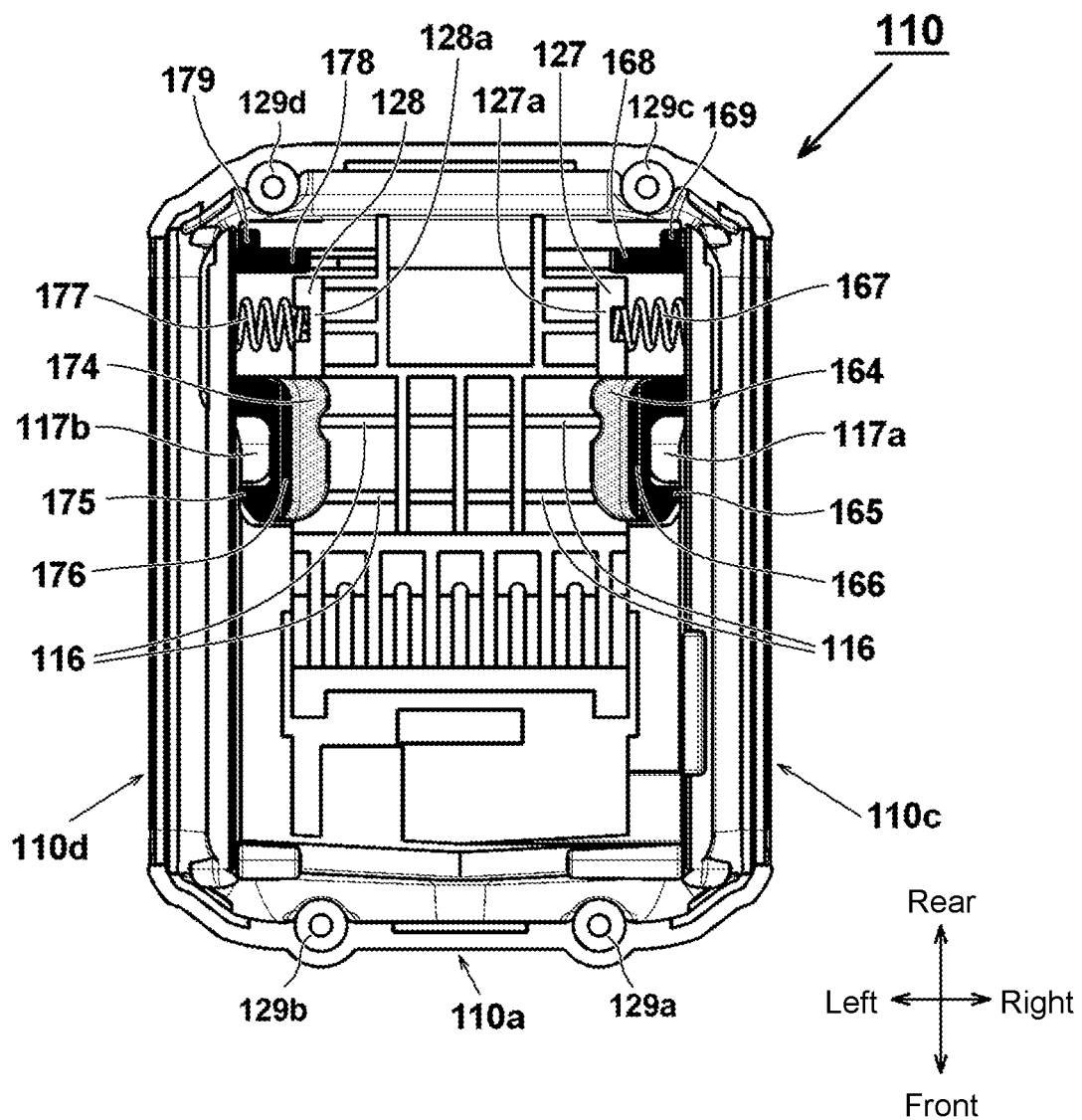
FIG. 12 is a bottom view of the upper case 110 (after the latches 160 and 170 are attached).

FIG. 12 is a bottom view of the upper case 110 and shows a state after the latches 160 and 170 are attached from the state of FIG. 11. The latches 160 and 170 are biased outward in the left-right direction by the two springs 167 and 177. Here, the latches 160 and 170 are painted black and hatched (164 and 174) so that the reference positions (positions not manipulated by the operator) of the latches 160 and 170 can be seen. The horizontal ribs 169 and 179 extending from the rear walls 168 and 178 of the latches 160 and 170 are held by the step parts 119a and 119b (see FIG. 11) formed on the wall surface of the upper case 110. The upper surfaces of the arm parts 164 and 174 of the latches 160 and 170 are held by the ribs 116. Further, in the figure, the vertical walls 166 and 176 extending downward from the arm parts 164 and 174 are painted black, and the other parts are hatched. Since the columnar stoppers 117a and 117b extending in the up-down direction are formed on the upper case 110 at the outer curved parts of the arm parts 164 and 174, the latch 160 cannot move outward in the right direction from the position shown in the figure. Similarly, the latch 170 cannot move outward in the left direction from the position shown in the figure. As shown in FIG. 12, when the latches 160 and 170 are attached to the inside of the upper case 110, a tool such as a screwdriver is not required, and in a state where one end of the springs 167 and 177 is engaged with the latches 160 and 170, it is only necessary to fit the other end of the springs 167 and 177 into predetermined positions (protrusions 127a and 128a) of the upper case 110. Thereafter, the upper case 110 is reversed, and the lower case 101 and the upper case 110 are aligned and then screwed.

Figure 13:
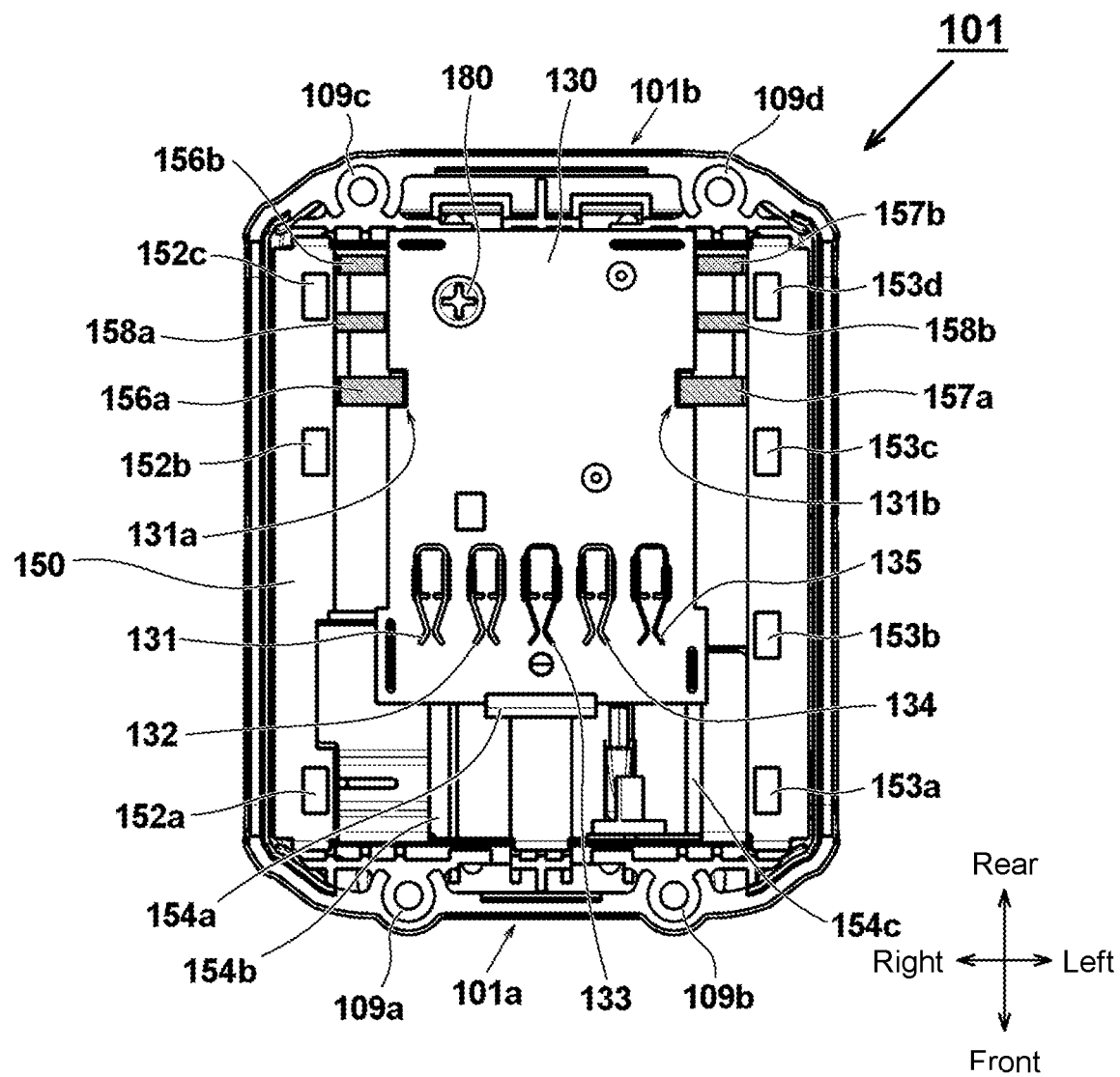
FIG. 13 is a top view of the battery pack 100 with the upper case 110 detached.

FIG. 13 is a top view showing the lower case 101 of the battery pack 100 and objects accommodated therein. In other words, FIG. 13 is also a top view of the battery pack 100 with the upper case 110 detached. The three battery cells 105 to 107 (see FIG. 8. Are accommodated inside the lower case 101, and the separator 150 made of synthetic resin is provided thereon. Four screw holes 109a to 109d are formed near a front wall 101a and a rear wall 101b of the lower case 101, and the upper case 110 is fixed by using the four screws 108a to 108d (see FIG. 6 and the like).

The circuit board 130 is provided on the separator 150. The circuit board 130 is hooked on the front side by a hooking part 154a and fixed on the rear side by the screw 180. Notch parts 131a and 131b are formed on both left and right sides of the circuit board 130, and by engaging with the ribs 156a and 157a formed integrally with the separator 150, the efficiency of the work of attaching the circuit board 130 to the separator 150 is improved. The five battery side terminals 131 to 135 are provided on the front part of the circuit board 130. The battery side terminals 131 to 135 are formed by cutting a flat plate made of a conductive metal by press working and then bending it into a U shape. On the front side of the battery side terminals 131 to 135, fitting parts are formed with both sides being close to each other so as to narrow from the tip to maintain the contact state after the body side terminals 62 to 65 (see FIG. 5) are inserted. The ribs 156a, 156b, 157a, 157b, 158a and 158b serving as support members provided on the separator 150 are disposed on both sides of the circuit board 130 in the left-right direction. The circuit board 130 can be easily positioned on the separator 150 by these support members, and the circuit board 130 can be positioned and then fixed to the separator 150 with the screw 180, so the assemblability can be improved.

Multiple ribs are formed on the upper surface of the separator 150 in accordance with the counterpart member which the separator 150 abuts. Ribs 154b and 154c extending in the longitudinal direction (front-rear direction) are formed to hold the circuit board 130. Convex ribs 152a to 152c are formed near the right end of the separator 150 to abut the inner wall of the upper case 110 when the upper case 110 is screwed. Similarly, convex ribs 153a to 153d are formed near the left end of the separator 150 to abut the inner wall of the upper case 110 when the upper case 110 is screwed. The two ribs 156a and 156b and the two ribs 157a and 157b respectively for holding the latches 160 and 170 are formed in the inner regions of the ribs 152c and 153d. Since these ribs 156a, 156b, 157a and 157b are formed on the upper surface of the separator 150, they are formed such that their long sides are oriented in the left-right direction. Further, the spring stopper 158a for preventing the spring 167 (see FIG. 8) from coming off is formed between the ribs 156a and 156b. Similarly, the spring stopper 158b for preventing the spring 177 (see FIG. 8) from coming off is formed between the ribs 157a and 157b.

In the battery pack 100 described above, the latches 160 and 170 are held by being sandwiched between the upper case 110 and the ribs 156a, 156b, 157a and 157b formed on the separator 150 without providing a dedicated pressing member for fixing the latches 160 and 170 to the upper case 110. Therefore, it is configured that the number of components can be reduced, and that the vertical height of the battery pack 100 can be reduced. Further, even though it is configured that a dedicated pressing member is omitted, since the latches 160 and 170 can be temporarily fixed to the upper case 110 during assembly, stable assembly can be performed while maintaining a state without compromising the assemblability. Furthermore, the battery pack can be miniaturized by reducing the number of components, and the assembly efficiency can be improved, and the cost can be reduced.

Although the disclosure has been described above based on the embodiments, the disclosure is not limited to the above embodiments, and various modifications can be made without departing from the spirit of the disclosure. In the above embodiments, an example of being applied to a battery pack in which the longitudinal direction of the battery cell is parallel to the attachment direction of the battery pack has been described, but the lower shape of the separator 150 is not limited, and it may be applied to a battery pack in which the longitudinal direction of the battery cell is orthogonal to the attachment direction of the battery pack. Further, the disclosure is also applicable not only to a battery pack in which battery cells are disposed in the horizontal direction but also to a battery pack in which battery cells are stacked in the horizontal direction and vertically in two stages. Further, although the latches 160 and 170 are configured to be supported by the ribs 156a, 156b, 157a and 157b of the separator 150, a rib may be provided to protrude upward from a part other than the separator 150 (such as the circuit board 130 or the lower case 101), and the latches may be supported by this rib.

What is claimed is:

1. A battery pack, comprising:
   a plurality of battery cells;
   a housing which has a first case part and a second case part located below the first case part and which accommodates the plurality of battery cells;
   a latch part provided on the first case part; and
   a separator which holds the battery cells and maintains the plurality of battery cells in an aligned state,
   wherein the latch part has a manipulation part to be manipulated by an operator, a biasing part which biases the manipulation part to an outside of the housing, and a first abutting part which one end side of the biasing part abuts,
   the manipulation part moves in a left-right direction on an inside of an upper wall of the housing, and a portion of the manipulation part is exposed to the outside from a through hole formed in the housing, and
   a support part which regulates the movement of the latch part in the left-right direction is provided on the separator.

2. The battery pack according to claim 1, wherein the support part supports the latch part from below.

3. The battery pack according to claim 1, wherein the separator is a synthetic resin molded product, and
   the support part is a protrusion formed to protrude from a surface of the separator, and an upper surface of the protrusion serves as a sliding surface with a lower surface of the manipulation part.

4. The battery pack according to claim 3, wherein the protrusion comprises a plurality of ribs formed on an upper surface of the separator and having long sides in the left-right direction.

5. The battery pack according to claim 1, wherein
   the housing has:
   an upper case, which is the first case part formed with a rail part and a connection terminal for attaching to an electrical equipment main body; and
   a lower case, which is the second case part closed by the upper case to form a space for accommodating the plurality of battery cells therein,
   the through hole is formed in a side wall surface of the upper case,
   a second abutting part is provided on an extension of an axis of the through hole and abuts an other end side of the biasing part, and
   the second abutting part has a surrounding part which surrounds at least a portion of the other end of the biasing part.

6. The battery pack according to claim 5, wherein the biasing part is a coil spring, and each of the first abutting part and the second abutting part is formed with a protrusion for holding the coil spring by protruding to a center of the coil spring, or with a recess for holding the coil spring by partially accommodating an end of the coil spring.

7. An electrical equipment, comprising:
   the battery pack according to claim 1; and
   a battery pack attachment part to which the battery pack is attached.

8. A battery pack, comprising:
   a plurality of battery cells;
   a housing which has a first case part and a second case part located below the first case part and which accommodates the plurality of battery cells;
   a latch part provided on the first case part;
   a separator which maintains the plurality of battery cells in an aligned state; and
   a circuit board fixed above the separator,
   wherein the latch part has a manipulation part to be manipulated by an operator, a biasing part which biases the manipulation part to an outside of the housing, and a first abutting part which one end side of the biasing part abuts,
   the manipulation part moves in a left-right direction on an inside of an upper wall of the housing, and a portion of the manipulation part is exposed to the outside from a through hole formed in the housing, and
   a support part which regulates the movement of the latch part in the left-right direction is provided on the circuit board.

* * * * *